United States Patent [19]
Wernicke

[11] Patent Number: 5,318,637
[45] Date of Patent: Jun. 7, 1994

[54] METHOD OF CLEANING URETHANE FOAM DISPENSERS USING HEATED WATER

[75] Inventor: Steven A. Wernicke, Wheaton, Ill.

[73] Assignee: Foamtek, Inc., West Chicago, Ill.

[21] Appl. No.: 20,033

[22] Filed: Feb. 18, 1993

Related U.S. Application Data

[63] Continuation of Ser. No. 770,709, Oct. 3, 1991, abandoned, which is a continuation of Ser. No. 532,218, Jun. 1, 1990, abandoned.

[51] Int. Cl.$^5$ ............................................. B08B 7/04
[52] U.S. Cl. ........................... 134/22.11; 134/22.15; 134/37; 134/40
[58] Field of Search ............... 134/22.11, 22.12, 22.13, 134/22.15, 37, 40; 222/148

[56] References Cited

U.S. PATENT DOCUMENTS

| | | | |
|---|---|---|---|
| 2,254,980 | 9/1941 | Simmons | 134/30 |
| 2,263,085 | 8/1951 | Utsinger | 134/2 |
| 3,457,108 | 7/1969 | Hittel | 134/22.1 |
| 3,740,267 | 6/1973 | Haylock | 134/10 |
| 3,764,384 | 10/1973 | Berni | 134/12 |
| 3,865,628 | 2/1975 | Callahan et al. | 134/2 |
| 4,440,320 | 4/1984 | Wernicke | 222/644 |
| 4,485,840 | 12/1984 | Erwin | 222/135 |
| 4,583,691 | 4/1986 | Smith | 239/112 |
| 4,895,603 | 1/1990 | Semp et al. | 134/21 |
| 4,898,327 | 2/1990 | Sperry et al. | 239/1 |
| 4,913,317 | 4/1990 | Wernicke | 222/1 |

OTHER PUBLICATIONS

Material Safety Data Sheet and Brochure for Nutra—Flush-3 by Brulin Corp., P.O. Box 270-B, Indianapolis, IN 46206-0270.

Primary Examiner—R. Bruce Breneman
Assistant Examiner—Saeed T. Chaudhry
Attorney, Agent, or Firm—Leydig, Voit & Mayer, Ltd.

[57] ABSTRACT

A method for removing residual polyurethane precursor components and foam from the interior of a polyurethane foam dispensing means prior to the solidification of said components, said means comprising a plurality of controllable feed tubes, said tubes being adapted for transporting and selectively introducing the precursor components into the interior of said dispensing means, said method comprising introducing a cleaning composition into the interior of said dispensing means to remove substantially all of the polyurethane foam precursor components and foam, said cleaning composition being at a temperature of at least 80° F. upon its introduction into said dispensing means and comprising water free of other solvents.

24 Claims, 5 Drawing Sheets

METHOD OF CLEANING URETHANE FOAM DISPENSERS USING HEATED WATER

This is a continuation of copending application Ser. No. 07/770,709 filed on Oct. 3, 1991 which is a continuation of Ser. No. 07/532,218 filed Jun. 1, 1990, both now abandoned.

FIELD OF THE INVENTION

This invention relates to a method for the cleaning of urethane foam dispensers and, more particularly, to such a method which includes the use of a cleaning composition comprising heated water.

BACKGROUND OF THE INVENTION

Polyurethane foams have long been recognized for their ability to act as an insulating material. These foams are prized due to their low density and relatively high insulating capability. As such, a number of products have used polyurethane foam as their primary means of insulation. One example of such a product is the refrigerator. During the manufacturing process, a fixed volume of foam is dispensed into the hollow refrigerator shell such that the cavity of the shell becomes filled with the expanded polyurethane foam, thereby creating an insulated food compartment.

The polyurethane foam itself is comprised of the reaction product of an isocyanate and a polyol, or blends thereof, which, upon contact, react to form the polyurethane foam. Accordingly, these foam precursor components are preferably contacted and mixed just prior to the time of application. In this way, foam is not formed from the precursor components prematurely, i.e., prior to the time the precursor components exit, or are on the verge of exiting, the dispenser.

As mentioned previously, the contact and mixing of the foam precursor components, and the resulting formation of the foam, should occur as close to the outlet of the dispenser as possible. Despite taking precautions in this regard, however, prematurely-formed foam can build up in the interior of the dispenser, clogging control valves and passageways such that the dispensing device is rendered inoperable.

As alluded to previously, one of the most difficult problems associated with these polyurethane dispensers is not the accurate metering of the various precursor components into a cavity, but cleaning the device after use. Despite the best efforts of designers to alleviate the problems of deposits forming on the interior surfaces of these devices, there remains troublesome solid deposits on valves, delivery lines, and other elements on these dispensing devices after only a relatively short period of use.

Various methods have been developed to remove these deposits from the interior of dispensing devices. Organic solvents, such as methylene chloride, have been used to clean polyurethane foam dispensers for years, these solvents being circulated through the interior of the dispensers after use. However, due to recent governmental regulations which restrict the disposal of these solvents, the industry has turned to other cleaners which do not contain these restricted components.

One example of a purportedly less environmentally harmful cleaner is Neutra-Flush III (Brulin & Company, Inc., Indianapolis, Ind.) which contains 1-5 percent sodium metasilicate. However, this cleaner also contains what is classified in the art as a solvent. In addition, this material, like other solvents, may cause irritation of the eyes and skin of the user. Moreover, the resulting polyurethane/solvent composition is also difficult to dispose of in view of present state and federal standards for waste disposal. However, permits for disposal of this cleaner are not as difficult to obtain as the aforementioned methylene chloride-based cleaners.

An alternative cleansing system is disclosed in U.S. Pat. No. 4,485,840. This patent provides a flushing system for a metered delivery apparatus, said apparatus being adapted for the delivery of an adhesive material. The adhesive material, which contains a water-dispersion polymer, such as a polyol, and polyisocyanate, may be flushed from the dispensing device (or gun) by use of this system. Generally, the system contemplates that warm water, which may include additions such as acids, bases or detergents, be circulated through those areas of the dispensing gun which contact the adhesive. Optionally, air may be delivered in short bursts to provide additional agitation for better cleaning action.

Further, a solvent cleaning fluid line is attached to the isocyanate delivery line of the gun, this solvent preferably being capable of solvating isocyanate. During cleaning, this solvent flows through the isocyanate delivery line and acts to remove the solid deposits derived from the isocyanate during use of the metering delivery system described previously.

In view of the limitations inherent in known polyurethane foam dispenser cleaning methods, a need exists for a solvent-free procedure which is non-toxic to humans, inexpensive, and relatively easy to dispose of after use.

SUMMARY OF THE INVENTION

The present invention provides a method for removing residual polyurethane precursor components and foam from the interior of a polyurethane foam dispensing means prior to the solidification of said components, said means comprising a plurality of controllable feed tubes, said tubes being adapted for transporting and selectively introducing the precursor components into the interior of said dispensing means, said method comprising introducing a cleaning composition into the interior of said dispensing means to remove substantially all of the polyurethane foam precursor components and foam, said cleaning composition being at a temperature of at least 80° F. upon its introduction into said dispensing means and comprising water free of other solvents.

BRIEF DESCRIPTION OF THE DRAWINGS

These and other objects and advantages of the present invention will become more readily apparent upon reading the following detailed description and upon reference to the accompanying drawings wherein.

While the invention will be described and disclosed in connection with certain preferred embodiments and procedures, it is not intended to limit the invention to those specific embodiments. Rather, it is intended to cover all such alternative embodiments and modifications as fall within the spirit and scope of the invention. For example, although the present invention will be described as a method for cleaning particular types of dispensers for polyurethane foam, the method of the present invention is also useful for cleaning other types of polyurethane foam dispensers, as will be readily apparent to those skilled in the art.

DETAILED DESCRIPTION OF THE PREFERRED EMBODIMENTS

The present invention provides a method for removing residual polyurethane precursor components and foam from the interior of a polyurethane foam dispensing means prior to the solidification of said components, said means comprising a plurality of controllable feed tubes, said tubes being adapted for transporting and selectively introducing the precursor components into the interior of said dispensing means, said method comprising introducing a cleaning composition into the interior of said dispensing means to remove substantially all of the polyurethane foam precursor components and foam, said cleaning composition being at a temperature of at least 80° F. upon its introduction into said dispensing means and comprising water free of other solvents.

Figure 1:
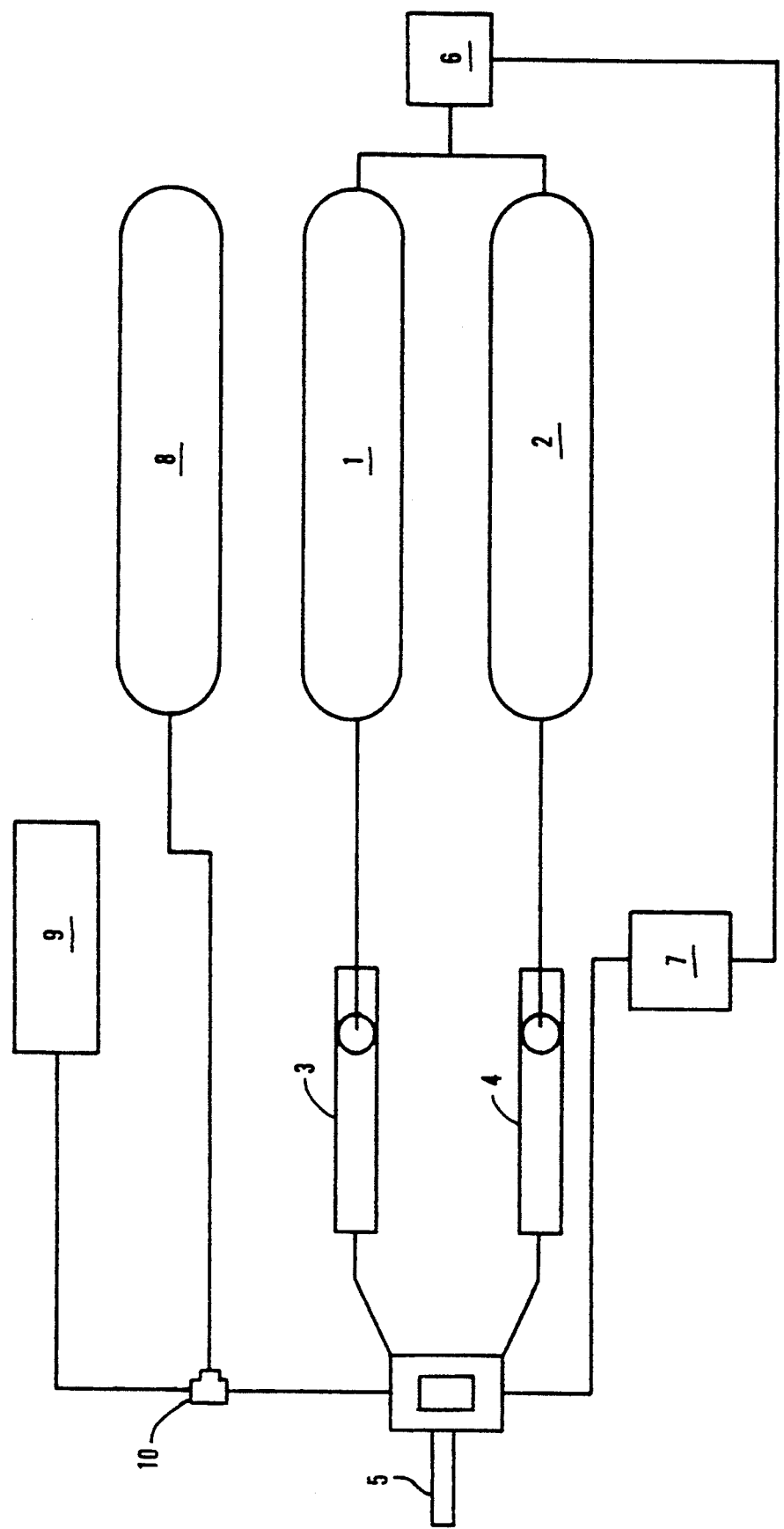
FIG. 1 is a schematic representation of a typical foam dispenser which may be cleaned using the method of the present invention.

Turning initially to FIG. 1, an exemplary polyurethane dispensing device is illustrated, for the purposes of the present discussion, as a schematic diagram. The device represented therein is adapted to provide a polyurethane foam which is formed from two precursor components. These components reside, until ready for use, in holding tanks 1 and 2. Typically, these tanks will contain a polyisocyanate and a polyol, respectively, which, upon activation of the dispenser flow controllers 3 and 4, flow into the mixing chamber 5 and are mixed and subsequently dispensed as a polyurethane foam.

A propellant, e.g., nitrogen, which resides in a storage tank 6, is used to dispense the precursor components from their containers and into the dispenser gun. A timer 7, is preferably connected to the propellant storage tank 6 such that a consistent, metered amount of polyurethane foam is delivered from the dispenser. An air compressor 8 may be advantageously used in combination with the water cleaning solution of the present invention to provide more rapid cleaning of the dispenser, this method being described in more detail infra.

The cleaning composition itself, which comprises water at a temperature of at least 80° F., is supplied from any suitable source, such as a pressurized tank 9. Preferably, said cleaning composition contains no additional solvents other than water. Upon cleaning, the cleaning composition flows from the tank 9, through a check valve 10, and into the interior of the dispenser such that the remaining precursor components and foam are removed from the interior of the dispenser. The cleaning composition may then be recirculated to the storage tank 9 or may be disposed of in an environmentally safe manner.

More particularly, the cleaning composition should be at least 80° F., this being the temperature at which adequate cleaning of the dispenser will occur, i.e., the remaining precursor components and foam are removed from the interior of the dispenser. Water at higher temperatures, including steam, may be advantageously employed as the water cleaning component.

By using a cleaning solution at a higher temperature, the use of solvents other than water, e.g., methylene chloride, is avoided. At temperatures above 80° F., the present composition was found to remove substantially all of the residual precursor components and foam, wherein compositions below this temperature are less effective and will not remove substantially all of said residual materials.

In addition to the water component, cleaning enhancers may be used in the present composition, e.g., detergents, surfactants, acids and bases, although these should be distinguished from the previously mentioned solvents. The use of the present cleaning composition which includes water, and optionally a cleaning enhancer, is advantageous over prior cleaners inasmuch as it is non-toxic to humans, is inexpensive, and is not harmful to the environment.

Figure 7:
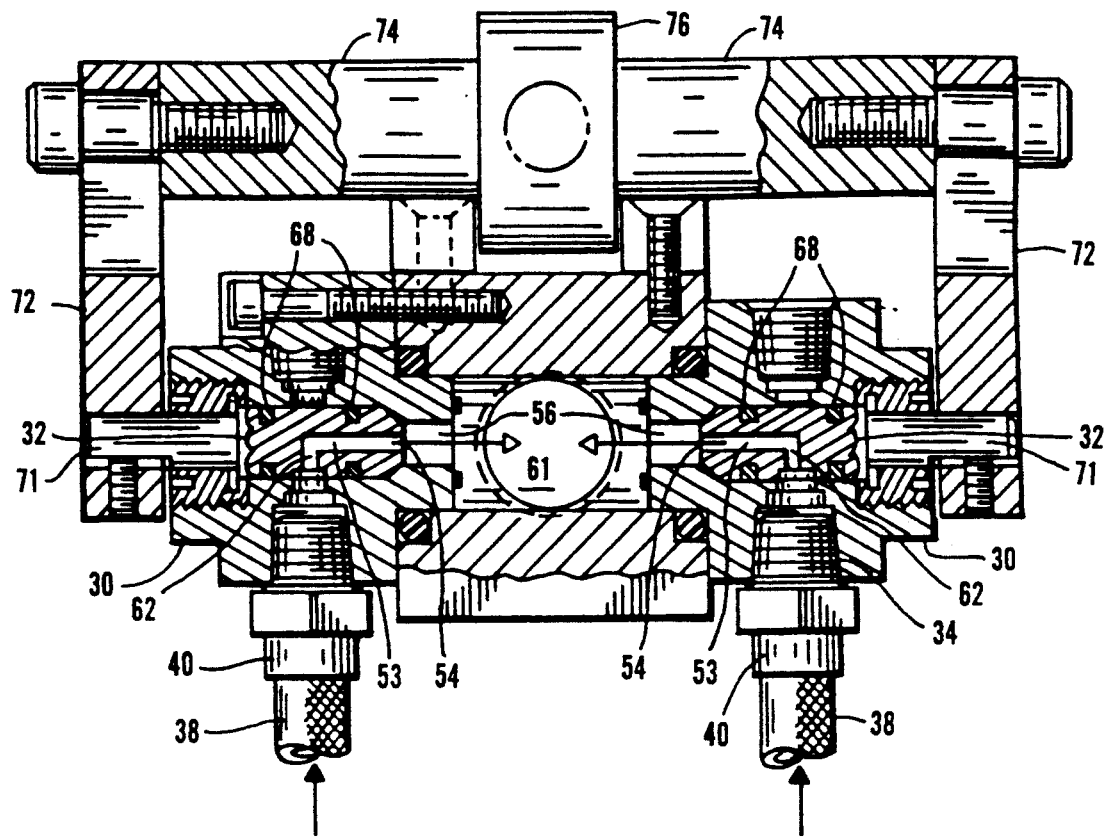
FIG. 7 is a cross-sectional view taken along the line 7—7 of FIG. 4, which further illustrates the internal construction of the valves and passageways in the preferred dispenser.

As an example of those dispensers which may be cleaned by the present invention, a preferred foam dispenser will be described, which dispenser includes a barrel having a plurality of passages which allow communication between a center plug and the fluid foam components and the cleaning component, warm water. The center plug can have a central bore comprising a mixing area as shown in FIG. 7, or can have discrete passages for each of the foam components. A detachable mixing chamber is connected to the center plug at the end of the barrel and communicates therewith to provide a chamber for the various foam components to meet and react to form the expanded foam. A nozzle is connected to the end of the mixing chamber and provides an opening for discharging the expanded foam from the dispenser. A rotary valve structure for each principal foam component is provided, each having a single passageway formed therethrough to permit the introduction of either the foam component or the cleaning composition through the valve and into the center plug.

The passageway for each valve is in communication with a passageway in the center plug and can move between a position in which either a foam component or cleaning composition is admitted into the gun. Each valve is provided with a tube for carrying the foam component to the dispenser, each such tube having a corresponding tube for carrying the cleaning composition. The distance between the point where the supply tubes are attached to the dispenser and the valves is short so that, after the valves are rotated to flush the dispenser with the cleaning composition, e.g., warm water, no significant amount of film components builds up in the dispenser during normal usage. In a preferred embodiment of the present method which utilizes air during cleaning, the cleaning composition tubes communicate with the rotary valve via a pipe tee. The pipe tee has a zert fitting and a check valve, the check valve being situated at the interface of the pipe tee and a compressed air feed tube.

In an alternative embodiment of the present method, air and the cleaning composition may be delivered to the interior of the dispenser in an alternating manner such that short bursts of each fluid are produced which act to clean the interior.

Figure 2:
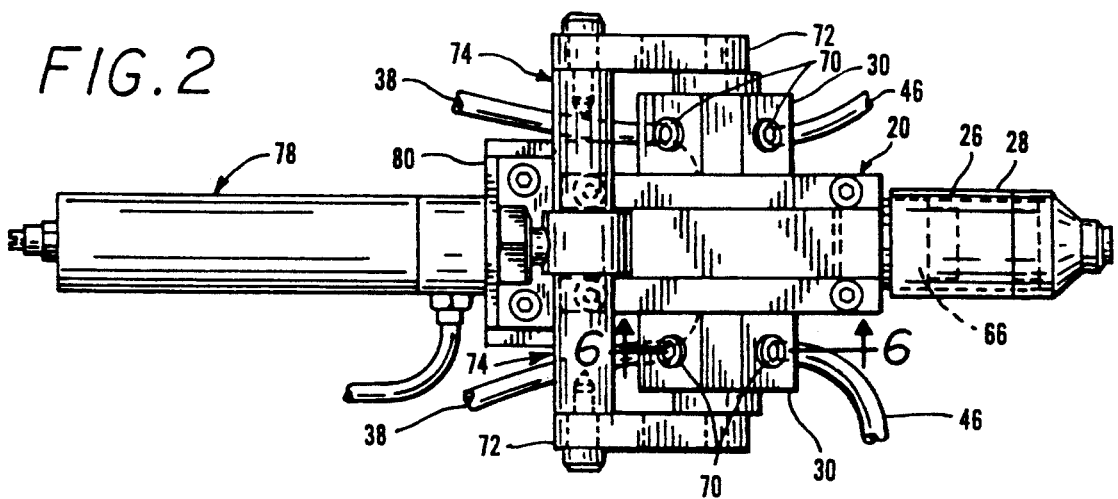
FIG. 2 is a top view of a foam dispensing apparatus in accordance with an exemplary embodiment of the present invention and illustrating the dispenser with the valves being positioned so that the cleaning composition is being admitted into the dispenser.
Figure 3:
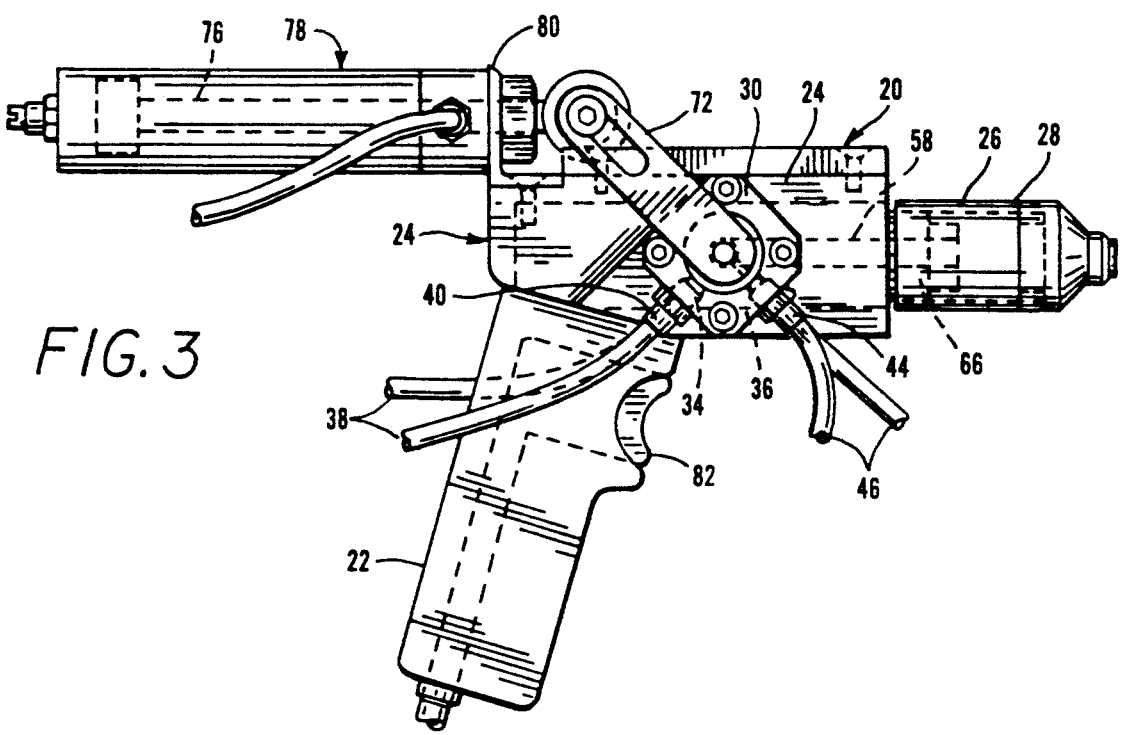
FIG. 3 is a side elevation view of the foam dispenser of FIG. 2.
Figure 5:
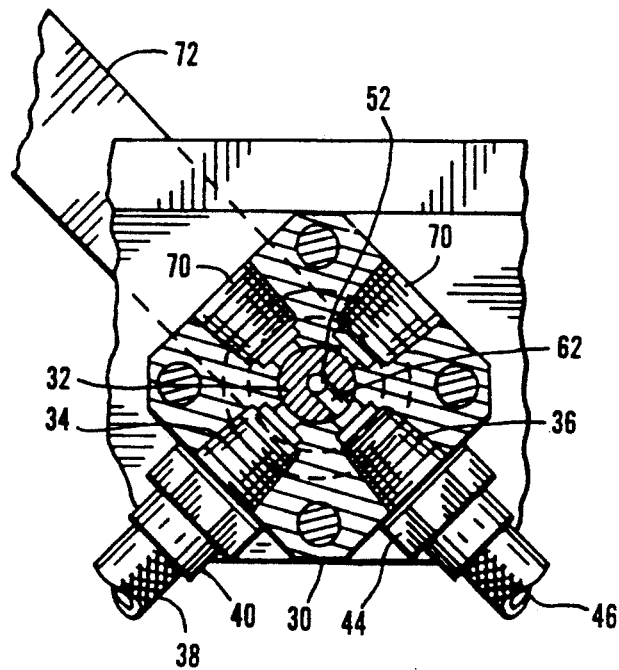
FIG. 5 is a cross-sectional view taken along line 6—6 of FIG. 2, showing the position of the valves when the cleaning composition is being admitted to the dispenser.
Figure 6:
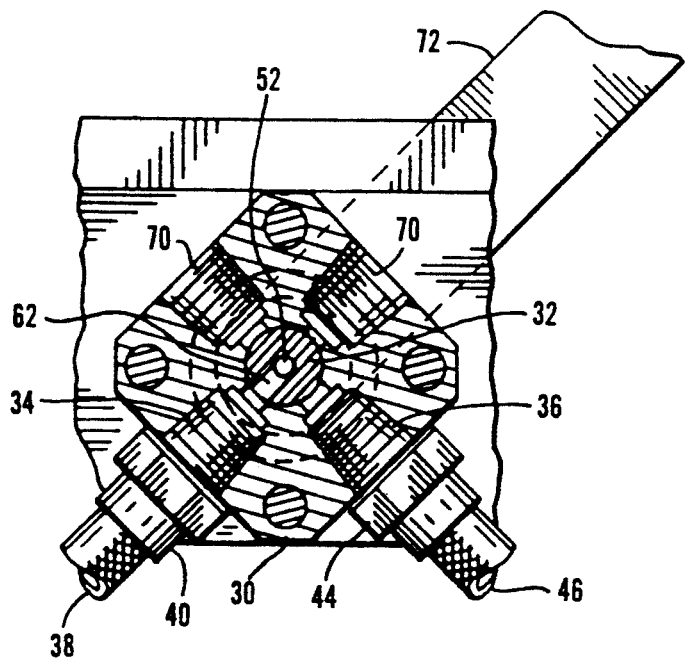
FIG. 6 is a cross-sectional view similar to FIG. 5 showing the position of the valves when the foam components are being admitted to the dispenser.

Turning again to the drawings, FIGS. 2 and 3 show generally a hand-held foam dispenser 20, having a handle 22 and a barrel 24. A mixing chamber 26 is attached to the end of the barrel and has a nozzle 28, with a passageway for discharging the expanded foam. Bosses 30 are affixed on opposite sides of the barrel 24. Each boss 30 carries a rotary valve, generally indicated by 52, as shown in FIGS. 5 and 6. A rotary valve is provided for each different fluid component required to make the expanded foam. Although generally only two principal components are required—a polyol blend and an isocyanate blend—thus necessitating only two valves 52, it is not intended that this invention be limited to the use of such components, or to an embodiment having only two valves. It should likewise be appreciated that additional foam components can be added to the polyol and isocyanate constituents if desired by the user.

The foam components and warm water sources are connected to the dispenser by separate attachment means. Thus, as shown, each boss 30 has two internally threaded ports 34 and 36 as shown in FIGS. 5 and 6. A conduit 38, which can be a flexible tube, is affixed to each foam component port 34. Tube 38 is removably secured to port 34 by a coupling 40, whose external threads cooperate with the internal threads of the port. While the cleaning composition inlet port 36 may also be connected to a conduit 46 by a coupling 44 (FIGS. 2 and 3), in a preferred embodiment, the water inlet port 36 is attached a pipe tee, which is attached to the port by a coupling 44. The coupling 44 has external threads which cooperate with the internal threads of the port 36, and internal threads that cooperate with the external threads of the pipe tee. One end of the pipe tee is connected to a conduit 46, which can be a flexible tube. Tube 46 communicates with the pipe tee via a check valve. A zert fitting, or other suitable one-way valve for the introduction of a substance into the system, is located at the end of the pipe tee opposite the check valve. The zert fitting allows the user to clean out foam components hydraulically from the pathways of the dispenser. It also seals any trace residue from the air, eliminating unwanted phenomenon such as film formation in the interior of the dispenser. The check valve is provided to prevent the foam components or purging medium from entering the cleaning composition feed tube 46 during cleaning.

Tubes 38 and 46 lead to sources of pressurized fluid foam components and cleaning composition, respectively (not shown). The admittance of the fluid foam components and the cleaning composition from their respective supply sources into the tubes may be regulated by a valve between the tube and the supply source which is readily accessible to the operator of the foam dispenser. Suitable supply sources for the fluid foam components such as drums and the like are well known and may be employed. Such sources of foam components include 15 to 8,000 gallon cylinders pressurized by applying pressurized nitrogen, supplied through a regulator, to the top of each cylinder. Pressurized fluids can also be supplied by a pumping device. Likewise, cleaning composition and air may be provided via a pressurized tank.

FIGS. 6 and 7 illustrate preferred valves 52, although those skilled in the art will appreciate that other valves can also be employed to implement the process described herein. Each valve has a single L-shaped passageway 53 with an outlet 54, which communicates through passage 56 to the center plug 60 which communicates with the mixing chamber 26 (the center plug 60 and mixing chamber 26 are exemplified in FIG. 4). Passageway 53 also has an inlet 62, which alternately rotates between communication with tube 38 when foam is to be dispensed, and with a pipe tee (exemplified as 42 in FIG. 8) when the apparatus is to be cleaned with the previously described cleaning composition following the completion of a foam-dispensing operation.

Figure 4:
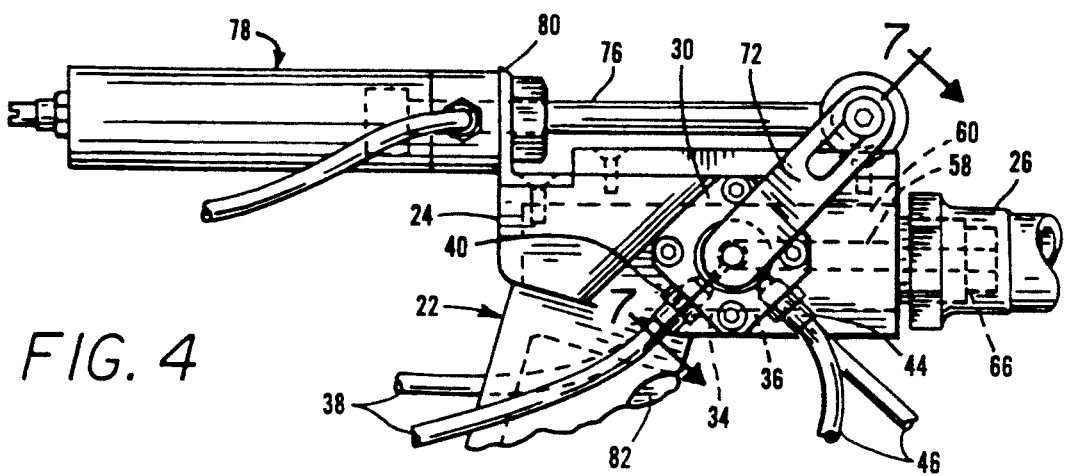
FIG. 4 is a side elevation view of the foam dispenser of FIG. 2, with the valves being positioned so that the components of the foam are being admitted into the dispenser, and illustrates, in accordance with another exemplary embodiment of the present invention, the use of a plastic tube containing mixing elements as the mixing chamber.

The mixing chamber 26 is preferably of a disposable type which can be discarded after use or cleaned several times without detachment via the use of the present method. Since the mixing chamber 26 is located outside the barrel 24, it can be removed from center plug 60 without the necessity of disassembling the dispenser, thus facilitating easy removal of the mixing chamber 26 for manual cleaning or replacement, if desired. As shown in FIG. 4, the mixing chamber may be a translucent plastic tube which includes disposable mixing elements. The length and diameter of this tube would vary depending upon the desired use of the dispenser by the operator.

As best shown in FIGS. 5, and 6, it is a feature of the dispenser of this invention that when the valves 52 are in position to emit either fluid components or a cleaning composition, the inlets 62 are nearly coterminuous with the ends of the couplings 40 and 44. Due to the single passageway 53 on each valve, the cleaner travels in the identical path that the foam components travel while in the dispenser. Preferably the distance between the point where either the foam components or cleaning solution are introduced into the dispenser and the point where they enter the valves is short, so that a more complete cleaning of the gun can be achieved.

In the illustrated form, the valves are grooved to receive O-rings 68, as best seen in FIG. 7, on which the valves are slidably mounted in a fluid-sealed relation with bosses 30. The bosses also have additional ports 70 (FIGS. 5 and 6), which are filled with a lubricant, such as petroleum jelly or dioctylphthlate (dop), and are plugged to allow the lubrication of the valves 52. The valve seats should desirably be made of a durable material so that the frequency of replacement can be minimized. Many suitable materials are known, with polytetrafluoroethylene resins being preferred.

A further feature of the dispenser of the present invention is its ability to deliver a predetermined amount of expanded foam. This feature is important when the foam is being introduced into a confined region, such as a refrigerator shell, where the operator wants to introduce neither too much nor too little foam, but wants to precisely fill the volume of the region. To this end, the valve inlets 62 are aligned with ports 54 for only the amount of time sufficient to allow the components needed to make the required volume of foam into the mixing chamber 26 via mixing area 61. After this time has elapsed, the inlets 62 move out of alignment with the ports 54, and no additional components are allowed to enter the mixing chamber 26 through the center plug 60. Thus, means are provided for moving all valves in unison between the position in which they communicate with the foam component carrying tubes and the position in which they communicate with the warm water carrying tubes.

In preferred embodiment, each valve 52 has a valve stem 71, best seen in FIG. 7, which extends out from the boss 30 and is keyed to be held for rotation by one end of a lever arm 72. The other end of each lever arm 72 is connected by an extension 74 to the rod 76 of a double-acting gas cylinder or piston 78 (FIG. 2) which is rigidly affixed to the foam dispenser 20 through an L-shaped bracket 80. The lever arms 72 are slotted to compensate for the straight line movement of piston rod 76. The movement of the piston rod 76 rotates the valves 52 in unison between the position in which foam components are allowed to enter the foam dispenser, when the piston rod 76 is in its extended position (shown in FIGS. 4 and 6), and the position in which the warm water is admitted to the foam dispenser, when the piston rod 76 is in its retracted position (shown in FIGS. 3 and 5).

The piston 78 provides timed actuating means for the valve and is actuated by the manipulation of a trigger switch 82 (FIG. 3), which is located in the handle 22. When manipulated, the trigger 82 feeds either a gas diverter valve or an electric control circuit which emits gas to the left-hand side of the piston, extending the piston rod 76 to move the valve 52 in unison into position to emit foam components (FIG. 4). After being in such a position for the amount of time required to introduce the amount of foam components required to make the desired volume of expanded foam, the piston rod 76 is automatically retracted by introducing gas to the right-hand side of the piston to bring the valves 52 in unison into position to admit the warm water (FIG. 3) and thus clean the foam dispenser of all foam components to prevent the dispenser from becoming clogged.

In a preferred embodiment, trigger 82 is connected to a commercially available low voltage switch cord. The switch cord is connected to a commercially available timer which has thumb wheels on its front for varying the time of each dispensing sequence between 0.1 and 99.9 seconds. The timer also has an LED display which shows the time remaining before gas is admitted to right-hand side of the piston to retract the piston rod 76 and, thus, rotate the valves 52 so that no foam components are introduced into the gun. By knowing the volume of the container to be filled, the flow rate of the foam components into the gun, and the expansion rate of the combined components, the operator can set the timer so that the volume of the expanded foam generated by the gun precisely fills the container. After the timer is set, any number of identical size containers can be filled to the desired level by simply pulling the trigger 82 to initiate the timing sequence.

Figure 8:
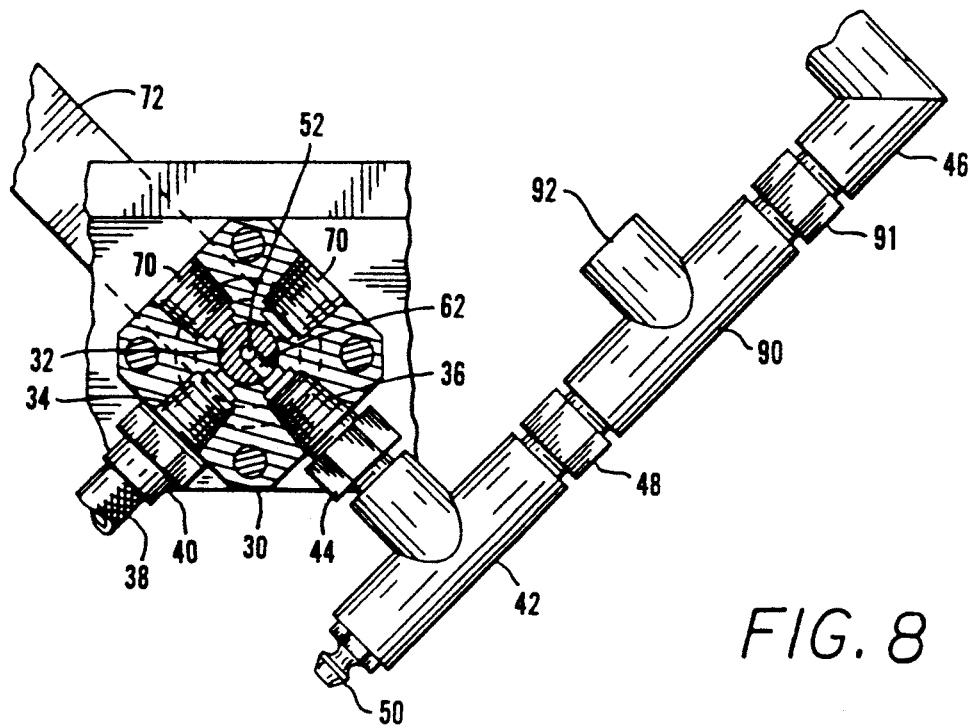
FIG. 8 is a cross-sectional view taken along line 6—6 of FIG. 2, FIG. 2 being similar to FIG. 5, which further illustrates, in accordance with another exemplary embodiment of the present inventive method, the attachment of a first pipe tee having a zert fitting and a first check valve, a second pipe tee attached to a source of cleaning composition as well as said first check valve, and a second check valve being to attached to said second pipe tee such that air and the cleaning composition may selectively enter the dispenser.

As mentioned previously, an alternative embodiment of the cleaning composition/compressed air delivery system, as illustrated in FIG. 8 (which closely resembles FIG. 5) further provides a second pipe tee 90 which is connected to the upstream end of check valve 48 in place of the conduit 46. Pipe tee 90 communicates on one end with a second check valve 91. This check valve 91 is in turn connected to conduit 46, which connects the dispenser to a supply of compressed air or other gas. The other opening in the second pipe tee 90 is connected to the warm water cleaning source.

The novel arrangement allows alternate short bursts of cleaning composition and compressed gas or air to be circulated through the dispenser until the precursor components are removed from the dispenser.

For purposes of exemplifying the operation of this embodiment, the cleaning composition is supplied to the dispenser by a pump. During the up stroke of the pump when the water pressure is at its minimum, the air will flow through conduit 46, check valve 91, tee 90, check valve 48, and into the dispenser. A short time later, when the pump is on its down stroke and the water pressure is at its maximum, the cleaner enters the pipe tee 90 at inlet 92 and proceeeds through check valve 48, its passage into the air conduit 46 being blocked by check valve 91. Thus, alternating short bursts of cleaner and compressed gas or air may be produced, this resulting in increased agitation of the cleaning fluids and, accordingly, enhanced cleaning of the dispenser.

In polyurethane dispensing guns which use a solvent to clean the residue from their interiors, such as those exemplified in U.S. Pat. No. 4,440,320 which is incorporated by reference herein, a supply line which carries the aforesaid cleaner may be placed in the position occupied by the solvent line to effectuate cleaning according to the present method. Other types of polymer foam dispensing devices may also be cleaned by the present method, including, e.g., dispensers available from the Olin Corporation.

Figure 9:
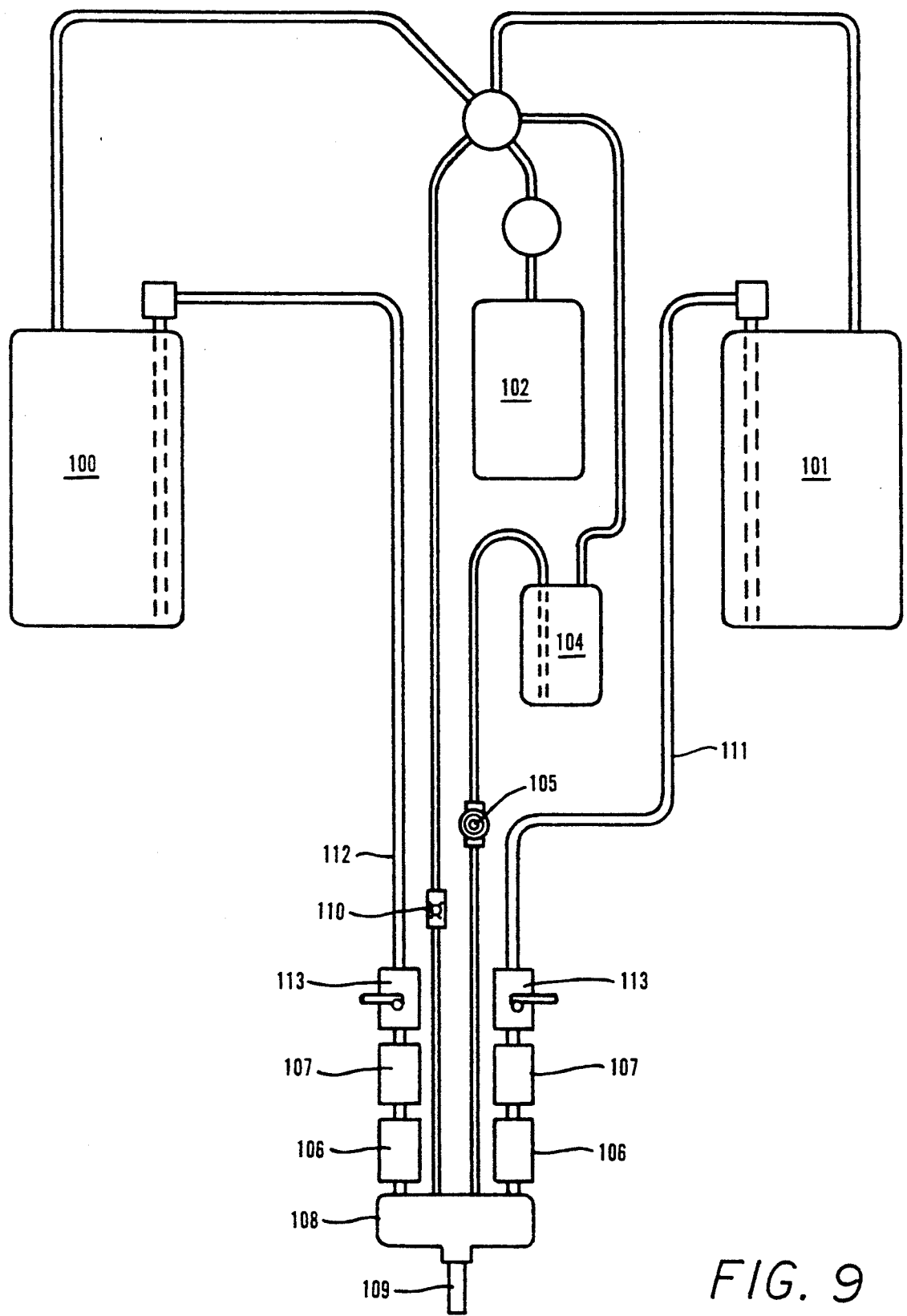
FIG. 9 is a schematic of an alternative foam dispensing system which may also be cleared of polyurethane foam and its precursor components by use of the cleaning method of the present invention.

A further example of a system in which the method of the present invention may be used to remove polyurethane precursors is schematically represented in FIG. 9. In this diagram, the precursor components are contained within storage tanks 101 and 102. A supply of a compressed gas which resides in storage tank 102 is used to provide streams of these components which flow through hoses 111 and 112 to the gun assembly 108. After entry into the assembly 108 these components are mixed in chamber 109 such that a polyurethane foam is produced upon exit of the mixture from the gun assembly 108. The compressed gas 102 also provides for the flow of the cleaning composition, e.g., warm water, from tank 104 to the gun assembly 108. The flow of cleaner in this system is controlled by valve 105, which is opened when cleaning of the gun is desired. If desired, alternate bursts of the cleaner and air may also be effected to clean the dispensing assembly 108.

In regard to controlling the flow of precursor components, valves 110 are provided which are adapted for selectively allowing the components to flow into the gun assembly 108. Further, flow valves 106 are provided for each component feed line which regulate the rate of flow of each component. In-line filters 107 are also provided for maintaining the purity of the precursor component feed.

I claim:

1. A method for removing residual non-water-soluble polyurethane precursor components present in a non-water-based foam-forming composition which comprises isocyanate and a polyol and the foam formed therefrom from the interior of a polyurethane foam dispensing means prior to the solidification of these components, said dispensing means comprising a plurality of controllable feed tubes, said tubes being adapted to transporting and selectively introducing the non-water-based foam-forming composition into the interior of said dispensing means, said method comprising introducing a cleaning composition into the interior of said dispensing means to remove the non-water-soluble polyurethane foam precursor components present in the non-water-based foam-forming composition which comprises isocyanate and a polyol and the foam formed therefrom prior to their solidification, said cleaning composition being at a temperature of at least 80° F. upon it introduction into said dispensing means and comprising water, wherein no solvents for said non-water-soluble precursor components and foam are used during the execution of said method.

2. The method of according to claim 1, wherein said cleaning solution is introduced into the interior of said dispensing means in a pulsating manner.

3. The method according to claim 1, further comprising introducing a gas into the interior of the dispenser, said gas being selectively introduced to said dispenser through said controllable feed tubes.

4. The method according to claim 3, wherein said gas and cleaning solution are alternatively introduced into said dispensing means in short pulsating bursts.

5. The method according to claim 1, wherein said water is in the form of steam.

6. The method according to claim 1, said dispensing means further comprising, in combination:
   (a) a barrel having a plurality of passages formed therein;
   (b) a mixing chamber connected to the barrel, the mixing chamber being located outside the barrel and in communication with said passages;
   (c) a nozzle connected to the mixing chamber and having a bore therethrough, one end of said bore communicates with the mixing chamber, while the other end provides an opening for discharging the expanded foam from the dispenser;
   (d) a tube for carrying each foam component to the dispenser, each such tube having a corresponding tube for carrying the cleaning composition to the dispenser;
   (e) a rotary valve component for each pair of foam precursor component and cleaning composition tubes, each such valve having a single passageway formed therethrough with an inlet and an outlet, each valve being mounted for movement on the barrel so that the inlet of each valve is rotatable between positions nearly coterminous with the outlets of the foam precursor component tubes and the cleaning component tubes, and the outlet of valve remains in communication with the barrel; and
   (f) means for moving all valves in unison between communication with the foam component carrying tubes and communication with the cleaning composition carrying tubes so that after the foam components have been mixed and the expanded foam discharged from the dispenser, the dispenser can be cleaned with the water from the point where the foam components enter the dispenser to the point where the foam components enter the mixing chamber.

7. The method according to claim 6, wherein valves on said dispenser means are moved by timed actuating means so that the inlet of each valve is in communication with its foam component carrying tube only for a period of time sufficient to allow the entry of components into the mixing chamber via the barrel to make a predetermined amount of expanded foam.

8. The method according to claim 7, wherein the timed actuating means comprises a double acting gas cylinder whose piston rod is connected by lever arms to each valve and activated by manipulation of a trigger switch located in the handle which is attached to the barrel.

9. The method according to claim 8, wherein the manipulation of the trigger switch feeds a gas diverter valve to activate the gas cylinder.

10. The method according to claim 8, wherein the manipulation of the trigger switch signals an electric control circuit to activate the gas cylinder.

11. The method according to claim 6, wherein the mixing chamber is detachable from the barrel.

12. The method according to claim 11, wherein the mixing chamber is disposable.

13. The method according to claim 6, wherein the mixing chamber comprises a plastic tube containing mixing elements.

14. The method according to claim 13, wherein the mixing chamber is translucent.

15. The method according to claim 6, wherein the cleaning composition tubes communicate with the rotary valve components via a pipe tee, said pipe tee comprising:
   (a) a check valve situated at the interface of the pipe tee and the water tubes; and
   (b) a one-way valve means situated on the opposite end of the pipe tee from the check valve for supplying compressed air into the pipe tee to clean the passageways of the dispenser and to seal out atmospheric moisture.

16. The method according to claim 1, wherein the cleaning composition tube communicates with the interior of said dispensing means via a pipe tee assemblage, said assemblage comprising:
   a first pipe tee in communication with said dispensing means wherein the first end is fitted with a one-way valve,
   a first check valve located on the second end of said first pipe tee;
   a second pipe tee, one end of which is in communication with said first check valve, said other end being in communication with a second check valve said second pipe tee being in communication with said controllable cleaning composition feed tube and, said second check valve being in communication with a controllable pressurized gas feed tube.

17. The method according to claim 16, wherein said cleaning composition and air are alternatively introduced into said dispensing means in short bursts.

18. The method according to claim 17, wherein said dispensing means further comprises, in combination:
   (a) a barrel having a plurality of passages formed therein;

(b) a mixing chamber connected to the barrel, the mixing chamber being located outside the barrel and in communication with said passages;

(c) a nozzle connected to the mixing chamber and having a bore therethrough, one end of said bore communicates with the mixing chamber, while the other end provides an opening for discharging the expanded foam from the dispenser;

(d) a tube for carrying each foam component to the dispenser, each such tube having a corresponding tube for carrying the cleaning composition to the dispenser;

(e) a rotary valve component for each pair of foam precursor component and cleaning composition tubes, each such valve having a single passageway formed therethrough with an inlet and an outlet, each valve being mounted for movement on the barrel so that the inlet of each valve is rotatable between positions nearly coterminous with the outlets of the foam precursor component tubes and the cleaning composition tubes, and the outlet of valve remains in communication with the barrel; and (f) means for moving all valves in unison between communication with the foam component carrying tubes and communication with the cleaning composition carrying tubes so that after the foam components have been mixed and the expanded foam discharged from the dispenser, the dispenser can be cleaned with the water from the point where the foam components enter the dispenser to the point where the foam components enter the mixing chamber.

19. The method of claim 18, wherein said cleaning composition further comprises a component selected from the group consisting of surfactants, acids, bases, and mixtures thereof.

20. The method according to claim 1, said dispensing means further comprising: (a) a barrel having a plurality of passages formed therein which are in communication with a mixing chamber; (b) a nozzle in communication with the mixing chamber and having a bore therethrough, one end of which provides an opening for discharging the expanded foam from the dispenser; (c) a tube for carrying each foam component to the dispenser, each such tube having a corresponding tube for carrying the cleaning composition to the dispenser; (d) a valve for each pair of foam component and cleaning composition tubes; (e) means for moving the valves between communication with the foam component tubes and communication with the cleaning composition tubes so that after the foam components have been mixed and the expanded foam discharged from the dispenser, the dispenser can be cleaned with the water.

21. The method of claim 1, wherein said cleaning composition further comprises a component selected from the group consisting of acids, bases, surfactants, and mixtures thereof.

22. A method for removing residual non-water-soluble polyurethane precursor components present in a non-water-based foam-forming composition which comprises isocyanate and a polyol and the foam formed therefrom from the interior of a polyurethane foam dispensing means prior to solidification of these components, said means comprising a plurality of controllable feed tubes, said tubes being adapted for transporting and selectively introducing the non-water-based foam-forming composition into the interior of said dispensing means, said method comprising introducing a cleaning composition comprising steam into the interior of said dispensing means to remove the non-water-soluble polyurethane precursor components present in the non-water-based foam-forming composition which comprises isocyanate and a polyol and the foam formed therefrom prior to their solidification, wherein no solvents for said non-water-soluble precursor components and foam are used during the execution of said method.

23. A method for removing residual non-water-soluble polyurethane precursor components present in a non-water-based foam-forming composition which comprises isocyanate and a polyol and the foam formed therefrom from the interior of a polyurethane foam dispensing means prior to solidification of these components, said means comprising a plurality of transporting and selectively introducing the non-water-based foam forming composition into the interior of said dispensing means, and at least one controllable tube for carrying a cleaning composition to said dispensing means, said tube carrying the cleaning composition communicating with said dispensing means via a pipe tee assemblage, said assemblage comprising a first pipe tee in communication with said dispensing means wherein the first end is fitted with a one-way valve, a first check valve located on the second end of said first pipe tee, and a second pipe tee, one end of which is in communication with said first check valve, said other end being in communication with a second check valve, said second pipe tee being in communication with said controllable cleaning composition with a controllable pressurized gas feed tube, said method comprising introducing a cleaning composition comprising steam into the interior of said dispensing means to remove the non-water-soluble polyurethane precursor components present in the non-water-based foam-forming composition which comprises isocyanate and a polyol and the foam formed therefrom prior to their solidification, wherein no solvents for said non-water-soluble precursor components and foam are used during the execution of said method.

24. A method for removing residual non-water-soluble foam-forming precursor components present in a non-water-based foam-forming composition which comprises isocyanate and a polyol and the foam formed therefrom from the interior of a polyurethane foam dispensing means prior to solidification of these components, said means comprising a plurality of controllable feed tubes, said tubes being adapted for transporting and selectively introducing the non-water-based foam-forming composition into the interior of said dispensing means, said method comprising introducing a cleaning composition comprising water into the interior of said dispensing means to remove the non-water-soluble polyurethane precursor components present in a non-water-based foam-forming composition which comprises isocyanate and a polyol, and the foam formed therefrom prior to their solidification, wherein no solvents for said non-water-soluble precursor components and foam are used during the execution of said method.

* * * * *

UNITED STATES PATENT AND TRADEMARK OFFICE
CERTIFICATE OF CORRECTION

PATENT NO. : 5,318,637

DATED : JUNE 7, 1994

INVENTOR(S) : STEVEN A. WERNICKE

It is certified that error appears in the above-identified patent and that said Letters Patent is hereby corrected as shown below:

Column 7, line 22, after "In" insert "a".

Column 9, line 12, delete "to" and substitute therefor -- for --;

Column 9, line 22, add "s" to the word "it";

Column 9, line 26, delete "of";

Column 12, line 20, after "of" insert -- controllable feed tubes, said tubes being adapted for --;

Column 12, line 35, after "composition" insert -- tube and said second check valve being in communication --;

Column 12, line 46, delete "foam-forming" and substitute therefor -- polyurethane --; and Column 12, line 60, after "polyol" delete ",".

UNITED STATES PATENT AND TRADEMARK OFFICE
CERTIFICATE OF CORRECTION

PATENT NO. : 5,318,637
DATED : June 7, 1994
INVENTOR(S) : Steven A. Wernicke

It is certified that error appears in the above-indentified patent and that said Letters Patent is hereby corrected as shown below:

Column 12, line 60, after "polyol" delete ",".

Signed and Sealed this

First Day of November, 1994

BRUCE LEHMAN

*Attest:*

*Attesting Officer*  *Commissioner of Patents and Trademarks*